(12) United States Patent
Benton et al.

(10) Patent No.: US 6,962,292 B1
(45) Date of Patent: Nov. 8, 2005

(54) PEEL BAR FOR SELECTIVE LABEL APPLICATION

(75) Inventors: Frances H. Benton, Keene, NH (US); Paul Bisson, Keene, NH (US)

(73) Assignee: Markem Corporation, Keene, NH (US)

( * ) Notice: Subject to any disclaimer, the term of this patent is extended or adjusted under 35 U.S.C. 154(b) by 0 days.

(21) Appl. No.: 10/843,027

(22) Filed: May 10, 2004

(51) Int. Cl.[7] ............................. G06K 19/00; G06F 3/12
(52) U.S. Cl. ...................................... 235/487; 238/432
(58) Field of Search ........................... 235/432, 487–488; 156/344, 361, 541, 584; 221/72, 73

(56) References Cited

U.S. PATENT DOCUMENTS

| | | | |
|---|---|---|---|
| 5,229,587 A * | 7/1993 | Kimura et al. ............... 235/432 |
| 6,231,253 B1 * | 5/2001 | Henderson et al. ......... 400/618 |
| 6,530,705 B1 * | 3/2003 | Petteruti et al. ............ 400/611 |
| 2002/0038693 A1 * | 4/2002 | Brough et al. ............... 156/541 |
| 2002/0117263 A1 * | 8/2002 | Mckenney et al. .......... 156/361 |
| 2003/0063139 A1 * | 4/2003 | Hohberger et al. ............ 347/2 |

* cited by examiner

Primary Examiner—Thien M. Le
Assistant Examiner—April Taylor
(74) Attorney, Agent, or Firm—Fish & Richardson P.C.

(57) ABSTRACT

An apparatus for selectively peeling a tag off of a strip of tags has a peel bar having a beak for peeling a tag off of the strip. The peel bar is mounted to be rotatable about a longitudinal axis thereof by movement of the strip. A retaining element selectively engages the peel bar. The retaining element has a first position in which the peel bar is held stationary, and a second position in which the peel bar is free to rotate.

12 Claims, 4 Drawing Sheets

PEEL BAR FOR SELECTIVE LABEL APPLICATION

FIELD OF INVENTION

The invention relates to application of labels on packages, and in particular, to selective rejection of defective labels.

BACKGROUND

Programmable transponders, such as RFID ("Radio Frequency Identification") tags, are adhesively mounted on a strip that is fed into a labeling machine. A labeling machine accepts packages to be labeled, programs each tag, confirms that the tag is correctly programmed, and then applies the tag to the package. A labeling machine of this type is described in a co-owned and concurrently filed patent application entitled "Merchandise Marking with Programmable Transponders," the contents of which are herein incorporated by reference.

Occasionally, a tag can prove to be defective. In such cases, it is preferable to dispose of the tag rather than allowing the tag to be applied to the package.

In one such labeling machine, a tag is held on a vacuum applicator pending a signal to either apply the tag to a package or to reject a tag. If the applicator receives a signal to accepts the tag, it blows the tag upon sensing the presence of a package. The tag thus adheres to the package. If the applicator receives a signal to reject that tag, it blows the tag upon confirming that no package is present. In this case, the tag goes through a gap between packages.

A difficulty arises when it is time to dispose of the rejected tags. Since the tags were merely blown away, they have a tendency to scatter upon leaving the high pressure air stream provided by the applicator. Because the tags are adhesive, they may adhere to nearby surfaces, making clean up more difficult. In some cases, they may even adhere to nearby packages.

SUMMARY

It is desirable, in a labeling machine, to provide a mechanism for neatly disposing of defective tags.

The present invention achieves this by providing a peel bar that peels a tag off of a strip of tags when the tag is deemed functional, but allows the tag to remain on the strip when the tag is deemed defective. The defective tags thus remain on the strip and are easily disposed of.

An apparatus for selectively peeling a tag off of a strip of tags has a peel bar having a beak for peeling a tag off of the strip. The peel bar is mounted to be rotatable about a longitudinal axis thereof by movement of the strip. A retaining element selectively engages the peel bar. The retaining element has a first position in which the peel bar is held stationary, and a second position in which the peel bar is free to rotate.

In one embodiment, the peel bar has a surface having a curved portion and a flat portion. The flat portion extends between the curved portion and a ridge for causing the tag to be peeled off the strip.

In another embodiment, the peel bar has a roller having a surface with a curved portion and a flat portion, and a beak having a first face fixed to the flat portion of the roller, and opposed second and third faces that meet to form a ridge for peeling the tag off the strip.

In another embodiment, the peel bar also has a pin extending radially outward therefrom for selectively engaging the retaining element. In these embodiments, the retaining element can be an obstruction moveable between a first position, in which the obstruction blocks the pin and thereby prevents rotation of the peel bar, and a second position in which the pin avoids the obstruction, thereby enabling rotation of the peel bar. Alternatively, the retaining element can include a shaft, and an obstruction mounted on the shaft, the shaft being moveable between a first position in which the obstruction obstructs movement of the pin, and a second position in which the pin avoids the obstruction.

Another aspect of the invention also includes a labeling machine having any of the peel bar embodiments described above. The peel bar in such a machine is disposed to intersect a path followed by a strip of tags.

In another aspect, the invention includes a method for selectively peeling a tag off of a strip of tags by holding a peel bar in a first configuration for causing a tag to be peeled off a strip; determining that a particular tag is defective; and releasing the peel bar, thereby allowing the peel bar to be rotated into a second configuration, thereby causing the particular tag to remain on the strip.

In one practice, the peel bar is released by removing an obstruction to rotation of the peel bar. Removing an obstruction can be accomplished by, for example, moving a shaft from a first position to a second position, the shaft having an obstruction mounted at an end thereof.

In another practice, holding a peel bar includes introducing an obstruction to prevent rotation of the peel bar.

Yet other practices include allowing the peel bar to be rotated back into the first configuration; and obstructing further rotation when the peel bar reaches the first configuration.

These and other features of the invention will be apparent from the following detailed description, and the accompanying figures, in which:

DETAILED DESCRIPTION

Figure 1:
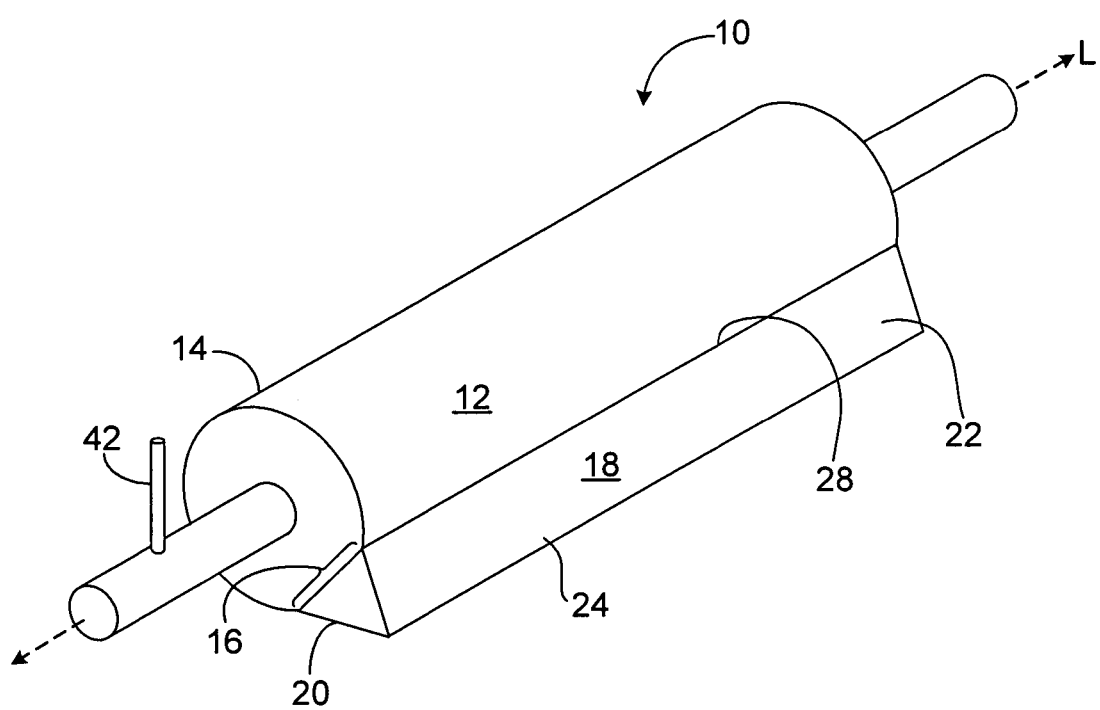
FIG. 1 shows a peel bar.

Referring to FIG. 1, a peel bar 10 for selectively peeling an RFID tag from a strip of tags includes a roller 12 extending along a longitudinal axis L. The roller 12 has a surface that is divided into a curved portion 14 and a flat portion 16.

The flat portion 16 provides a mounting spot for a bar having a triangular cross-section 18, referred to as a "beak." The beak 18 has a leading face 20 and a trailing face 22 that meet at a ridge 24. The ridge is sharp enough to cause a tag to peel off, but not so sharp that it cuts the tape. In the illustrated embodiment, the beak has a radius-of-curvature of approximately 1/32". The leading and trailing faces 20, 22 are joined by a flat base 28 that is sized to fit onto the flat portion 16 of the roller 12. The base 28 of the beak 18 is fixed to the flat portion 16 of the roller 12 so that the roller 12 and the peak can spin around the longitudinal axis as a unit.

Figure 2:
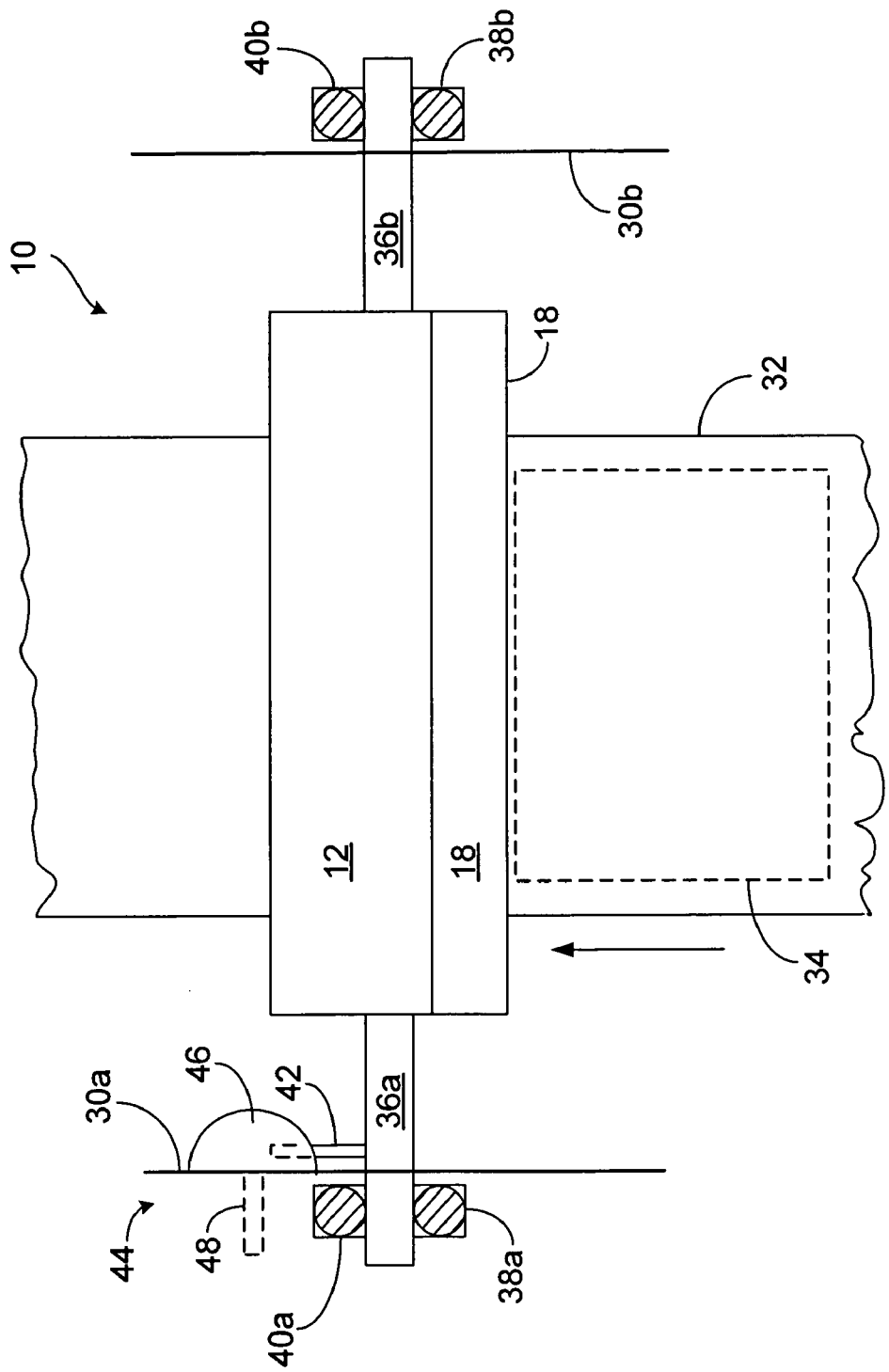
FIG. 2 shows the peel bar of FIG. 1 as mounted in a labeling machine.

As shown in FIG. 2, the peel bar 10 is mounted to opposed mounting surfaces 30a, 30b on a labeling machine, an exemplary one of which is described in a co-owned and concurrently filed U.S. patent application entitled "Merchandise Marking with Programmable Transponders", the contents of which are herein incorporated by reference. In this configuration, the peel bar 10 intersects a path traveled by a strip 32 having RFID tags 34 adhesively mounted thereon. Longitudinally extending ends 36a, 36b of the peel bar 10 are inserted into respective openings in the center of an annular track 38a, 38b containing ball bearings 40a, 40b. This enables the peel bar 10 to spin readily, with little friction.

When oriented as shown in FIG. 2, the beak 18 scrapes the strip 32 as the strip 32 slides by. When a leading edge of a tag 34 reaches the beak ridge 24, the beak ridge 24 causes the tag 34 to be peeled off the strip 32. The free tag 34 is then sucked onto a vacuum applicator (not shown) which holds the tag 34 with its adhesive side facing outward, away from the vacuum applicator. Once a package to be labeled is within range, the vacuum applicator reverses the air flow and blows that tag 34 toward the package.

In some cases, however, the tag 34 proves to be defective. When this is the case, the tag 34 should not be applied to the package. Instead, it should be discarded.

Figure 4:
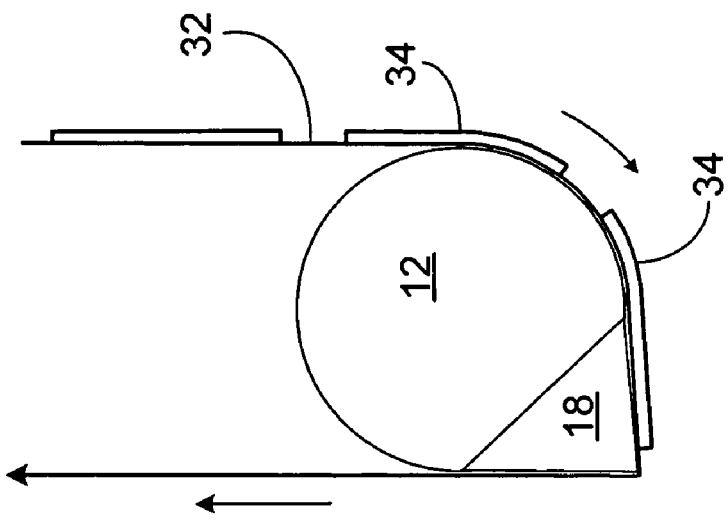
FIG. 4 shows the peel bar of FIG. 2 in a position in which tags are permitted to remain on the strip.
Figure 3:
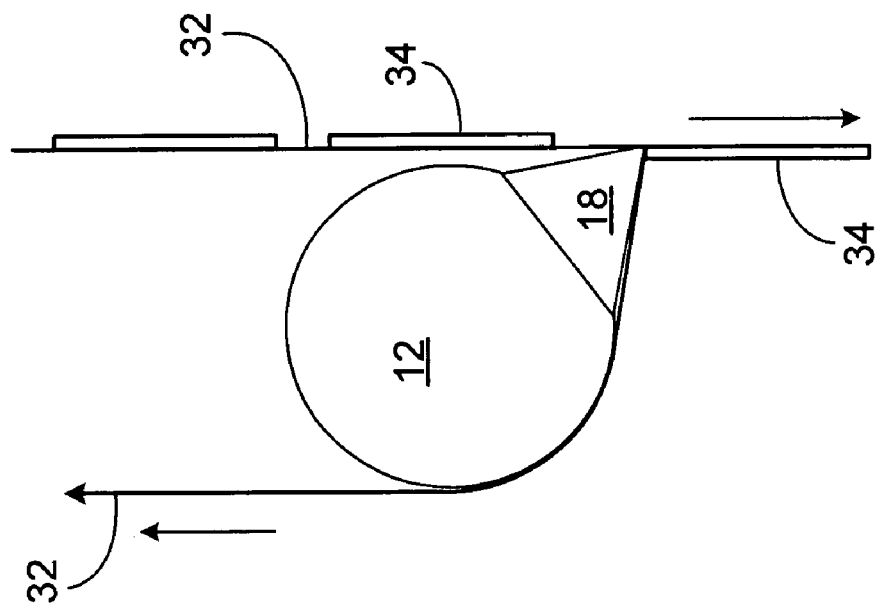
FIG. 3 shows the peel bar of FIG. 2 in a position for peeling labels off of a strip of tags.

The peel bar 10 selectively peels tags 34 off the strip 32 by switching between an accepting state, in which it is fixed in the position shown in FIG. 3, and a rejecting state, in which it is free to spin about its longitudinal axis, as shown in FIG. 4.

The transition between the accepting and rejecting states of the peel bar 10 is effected in part by an interaction between a pin 42 extending radially outward from one end 38a of the peel bar 10 and a pneumatically-actuated retaining element 44 that selectively engages the pin 42 in response to instructions from a processor (not shown) that controls the labeling machine.

Figure 5:
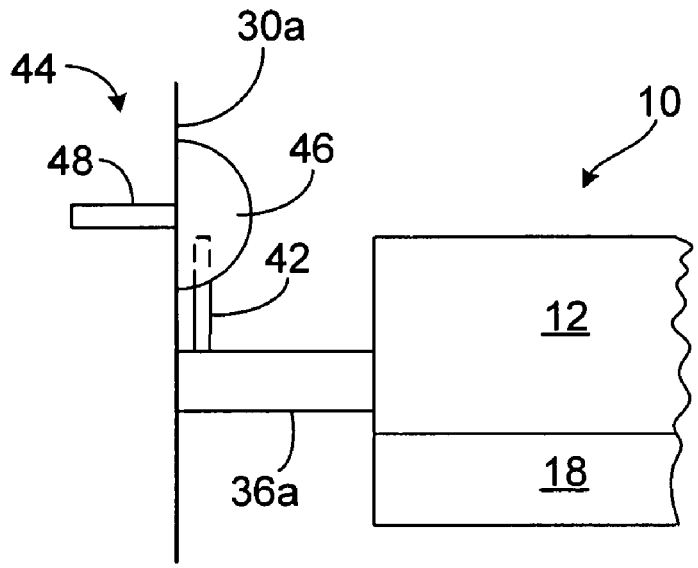
FIG. 5 shows a retaining element in a position for preventing spinning of the peel bar.
Figure 6:
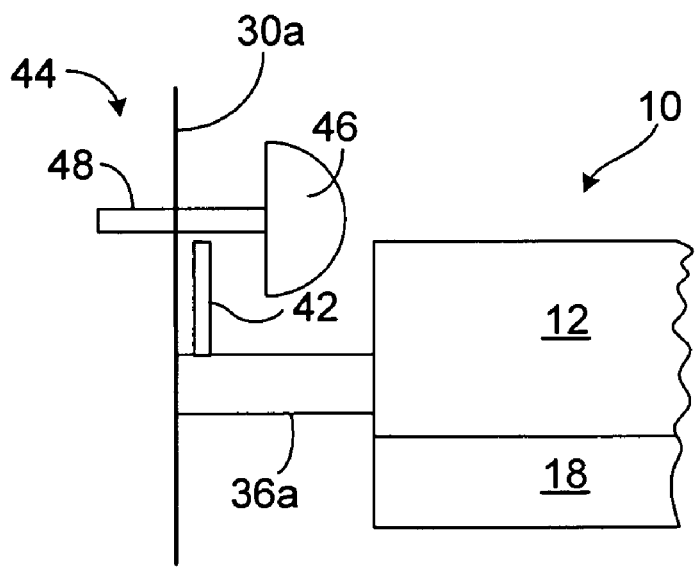
FIG. 6 shows the retaining element of FIG. 5 in a position that enables spinning of the peel bar.

FIGS. 5 and 6 show one such retaining element, which in this case takes the form of a button 46 mounted onto an end of a shaft 48. The retaining element switches between a first position, shown in FIG. 5, in which the button 46 is flush with the mounting surface 30a, and a second position, shown in FIG. 6, in which the button 46 is separated from the mounting surface 38a by a gap.

In the first position, shown in FIG. 5, the button 46 impedes rotation of the peel bar 10 by blocking the pin 42. In the second position, shown in FIG. 6, the button 46 has moved out of the way, thereby enabling the pin 42 to pass unimpeded through the gap. In this second position, friction between the moving strip 32 and the peel bar 10 causes the peel bar 10 to rotate around its longitudinal axis. The rotation of the peel bar 10 is thus driven by the strip itself. Hence, the peel bar 10 does not require a separate motor to rotate it.

The labeling machine includes a transponder (not shown) that programs each tag 34 while the tag 34 is on the strip 32. The transponder then tests each tag 34 to ensure that the tag 34 has been properly programmed. This occurs before the tag 34 reaches the peel bar 10.

If the transponder determines that the tag 34 is correctly programmed, it does nothing. The retaining element thus remains in the first position. The peel bar 10 thus remains in the accepting state shown in FIG. 2 and the beak 18 causes the tag 34 to be peeled off the strip 32.

If the transponder determines that the tag 34 is defective, it signals the processor. The processor waits until a leading edge of the tag 34 rests on the flat surface of the beak's trailing face 22. The controller then causes the pneumatic actuator to move the retaining element 44 into the second position. With the retaining element 44 in the second position, the peel bar 10 is free to rotate. The friction caused by the movement of the strip past the peel bar 10 causes the peel bar 10 to rotate so that the beak 18 is no longer in a position to cause the tag 34 to be peeled away from the strip 32. Because the leading edge of the tag 34 engages only the flat surface of the beak's trailing face 22, the tag 34 is unlikely to peel off by accident. The tag 34 then continues past the peel bar 10 while still remaining attached to the strip 32.

As the peel bar 10 spins, the strip 32 continues to engage first the trailing face 22 and then the curved portion 14 of the roller's surface, thereby causing the peel bar 10 to continue to rotate until the beak 18 is once again in a position to cause peeling of tags 34 off the strip 32. Before the beak 18 reaches this point, the controller causes the pneumatic actuator to restore the retaining element to its first position, so as to stop the peel bar 10 from spinning further. As a result, the peel bar 10 is ready to cause the next tag 34 to be peeled off the strip 32.

The peel bar described herein is made by joining two pieces together, namely a beak and a roller. However, it will be appreciated that the peel bar can be a unitary piece having the same general shape as that disclosed herein. Moreover, it is not necessary for the beak to be the interjection of two flat surfaces. An intersection of a flat and a curved surface will also form a beak that functions as descried herein.

In addition, other types of retaining elements can be substituted for that described herein. The movable portion of the retaining element need not be on the mounting surface but can instead be on the peel bar. What is important is that the retaining element have two states, one in which rotation of the peel bar is suppressed, and another in which rotation is permitted. The retaining element need not be pneumatically actuated, but can also be activated electromagnetically, for example by a solenoid, or it manually.

The invention is not restricted to RFID tags or to disposal of defective tags. The invention in fact provides a way to selectively apply a tag to a package on the basis of a condition associated with either the tag, or the package, or both. In the particular application described herein, the tags are RFID tags and the condition that triggers rejection of a tag is whether the RFID tag is defective.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

Having described the invention, and a preferred embodiment thereof, what is claimed as new, and secured by Letters Patent is:

1. An apparatus for selectively peeling a tag off of a strip of tags, the apparatus comprising:
    a peel bar having a beak for peeling a tag off of the strip, the peel bar being mounted to be rotatable about a longitudinal axis thereof by movement of the strip; and
    a retaining element for selectively engaging the peel bar, the retaining element having a first position in which the peel bar is held stationary, and a second position in which the peel bar is released.

2. The apparatus of claim 1, wherein the peel bar comprises a surface having a curved portion and a flat portion, the flat portion extending between the curved portion and a ridge for causing the tag to be peeled off the strip.

3. The apparatus of claim 1, wherein the peel bar comprises:
   a roller having a surface, the surface having a curved portion and a flat portion;
   a beak having a first face fixed to the flat portion of the roller, and opposed second and third faces that meet to form a ridge for peeling the tag off the strip.

4. The apparatus of claim 1, wherein the peel bar comprises a pin extending radially outward therefrom for selectively engaging the retaining element.

5. The apparatus of claim 4, wherein the retaining element comprises an obstruction moveable between a first position, in which the obstruction blocks the pin and thereby prevents rotation of the peel bar, and a second position in which the pin avoids the obstruction, thereby enabling rotation of the peel bar.

6. The apparatus of claim 4, wherein the retaining element comprises a shaft, and an obstruction mounted on the shaft, the shaft being moveable between a first position in which the obstruction obstructs movement of the pin, and a second position in which the pin avoids the obstruction.

7. A labeling machine comprising an apparatus as recited in claim 1, the apparatus being disposed within the labeling machine to intersect a path followed by a strip of tags.

8. A method for selectively peeling a tag off of a strip of tags, the method comprising:
   holding a peel bar in a first configuration for causing a tag to be peeled off a strip;
   determining that a particular tag is defective; and
   releasing the peel bar, thereby allowing the peel bar to be rotated into a second configuration, thereby causing the particular tag to remain on the strip.

9. The method of claim 8, wherein releasing the peel bar comprises causing removing an obstruction to rotation of the peel bar.

10. The method of claim 9, wherein removing an obstruction comprises moving a shaft from a first position to a second position, the shaft having an obstruction mounted at an end thereof.

11. The method of claim 8, wherein holding a peel bar comprises introducing an obstruction to prevent rotation of the peel bar.

12. The method of claim 8, further comprising allowing the peel bar to be rotated back into the first configuration; and obstructing further rotation when the peel bar reaches the first configuration.

* * * * *